United States Patent [19]

Perkins

[11] Patent Number: 4,796,895
[45] Date of Patent: Jan. 10, 1989

[54] SELF ADJUSTING SEAL FOR HIGH PRESSURE SUPPLY LINE

[75] Inventor: Robert L. Perkins, Howell, Mich.

[73] Assignee: General Motors Corporation, Detroit, Mich.

[21] Appl. No.: 148,297

[22] Filed: Jan. 25, 1988

[51] Int. Cl.⁴ .................. F16J 15/00; F16J 15/32
[52] U.S. Cl. .................................. 277/4; 277/152
[58] Field of Search ............... 277/4, 35, 36, 37, 38, 277/39, 40, 41, 165, 42, 43, 44, 45, 46, 47, 48, 49, 50, 51, 52, 152, 153, 12, 32; 285/95, 96, 100, 101, 109, 110; 74/DIG. 1; 192/110 R

[56] References Cited

U.S. PATENT DOCUMENTS

| | | | |
|---|---|---|---|
| 2,662,480 | 12/1953 | Cliborn | 277/12 |
| 2,765,080 | 7/1956 | Andresen et al. | 277/4 |
| 2,822,197 | 2/1958 | Champ et al. | 277/36 |
| 2,874,983 | 2/1959 | Densmore | 277/4 |
| 3,525,530 | 8/1970 | Bauer et al. | 277/165 |
| 3,814,445 | 6/1974 | Bitzan | 277/165 |

Primary Examiner—William A. Cuchlinski, Jr.
Assistant Examiner—Petar Arsenovic
Attorney, Agent, or Firm—Patrick M. Griffin

[57] ABSTRACT

A seal assembly for use in the high pressure oil supply inlet to an automatic transmission piston includes an outer sleeve and a spring loaded inner sleeve with a lip seal and the top and a compression seal at the bottom. The seal assembly self adjusts for tolerance stack up, and also increases its sealing pressure with the introduction of high pressure oil.

2 Claims, 1 Drawing Sheet

SELF ADJUSTING SEAL FOR HIGH PRESSURE SUPPLY LINE

This invention relates to seals in general, and specifically for a self adjusting seal assembly for the line that supplies high pressure oil to an input clutch in an automatic transmission.

BACKGROUND OF THE INVENTION

Automatic transmissions typically include input clutch units that have a piston that engages and releases a pack of friction disks to engage and disengage a gear set. Referring to FIG. 1, a portion of a cast aluminum transmission case is indicated generally at 10. Located within case 10 is a cylindrical steel piston 12. High pressure oil must be supplied from outside of case 10 and through piston 12 in order to drive the piston 12. Case 10 has a boss 14 through which an inlet 16, which is generally in the form of a stepped cylinder, is machined. Inlet 16 opens to a portion of the outer surface of piston 12 which, since the diameter of inlet 16 is significantly smaller that the diameter of piston 12, in effect forms a generally planar bottom wall to inlet 16. A central port 18 drilled through piston 12 is generally coaxial to inlet 16. The outer portion of piston 12 does not move appreciably relative to inlet 16. The supply line for pressurized oil includes a pipe 20 that fits centrally within inlet 16, with a formed circular ridge 22 that acts as a stop member. At a location on case 10 not illustrated in FIG. 1, pipe 20 makes a ninety degree bend, and is held down by a strap type retainer bolted to case 10 that prevents pipe 20 from pulling out of inlet 16.

Not only is it necessary to physically retain pipe 20, sealing must be provided around pipe 20 both to prevent the high pressure oil that it supplies from escaping between the bottom of inlet 16 and piston 12, and to also prevent it from escaping through the top of inlet 16. The known seal shown in FIG. 1 provides those two necessary sealing functions with two separate, independent structures. The first sealing function is provided by a lower seal assembly designated generally at 24. The lower seal assembly 24 includes a metal sleeve 26 to which a rubber compression seal 28 is molded. Before pipe 20 is added, sleeve 26 is press fitted into the lower portion of inlet 16 until seal 28 is sufficiently compressed against piston 12 in surrounding relation to port 18. The seal 28 would not, as a practical matter, be visible to the installer during this process. Therefore, unless a pressure sensitive tool were used to insert sleeve 26 and stop it when some threshold or reference pressure was reached, then the necessary compression of seal 28 would have to be achieved and limited by some other means. Possible methods could include stopping the insertion of sleeve 26 when its upper edge reached a defined reference point on the inner surface of inlet 16, or monitoring the distance between the top edge of sleeve 26 and the piston 12, and stopping the insertion of sleeve 26 at the value of that distance where the compression of sleeve 28 should have reached the correct value. Any such means of limiting and defining the compression of seal 30 would inevitably be at least somewhat dependent on how well the manufacturing tolerances were held between the piston 12 and the reference point on the inlet 16, or between the seal 28 and the top edge of sleeve 26, or both. While those tolerances can be held sufficiently closely, it would clearly be easier and potentially less costly to have a seal that could tolerate less precisely held tolerances. Furthermore, the amount of the compression of seal 28, which determines its sealing effectiveness, would be essentially invariant once seal 24 was installed. The other necessary sealing function is provided by an O-ring 30, which is added after seal 24. O-ring 30 is compressed between a lower washer 32 that is first seated on the step of inlet 16 and an upper washer 34 that is seated on top of O-ring 30 and which is pressed downwardly by the pipe ridge 22 after pipe 20 is fastened in place. Thus, several steps are necessary to install all the sealing structures.

SUMMARY OF THE INVENTION

The invention provides a seal assembly for use with the pressurized oil supply pipe described above which is self adjusting, both in terms of tolerating wider manufacturing tolerances and in terms of increasing its sealing effectiveness when the pressure of the supplied oil increases. The seal assembly of the invention may also be easily installed in one step.

In the preferred embodiment disclosed, the seal assembly includes a pair of generally coaxial and cylindrical sleeves, a first, outer sleeve and a second, inner sleeve, stamped of sheet steel. The first sleeve has radially spaced inner and outer walls joined at the top by an annular wall. The outer wall fits tightly enough within the inlet to retain the first sleeve, and the inner wall receives the pipe tightly enough to prevent the escape of oil out the top of the inlet. The second sleeve is located radially between the inner and outer walls of the first sleeve, and also has an upper annular wall that faces and is axially spaced from the annular top wall of the first sleeve. A lip seal molded to the second sleeve annular wall wipes on the inside of outer wall of the first sleeve. The second sleeve also has a lower edge near the piston to which a compression seal is molded that engages the piston and surrounds the port through the piston. A wave type spring is compressed between the two facing annular walls of the sleeves, which biases the compression seal down against the piston regardless of tolerance variations in the spacing between the first sleeve annular wall and the piston. When high pressure fluid exits the pipe, it flows between the inner wall of the first sleeve and the second sleeve into the axial space between the facing annular walls of the two sleeves. Since its exit from that space is blocked by the lip seal, the axial space is pressurized, which forces the compression seal more strongly against the piston, preventing the escape of oil between the bottom of the inlet and the piston. In the embodiment disclosed, the two sleeves can also be retained together as a unit and installed in a single step.

It is, therefore, an object of the invention to provide a self adjusting seal assembly that prevents the loss of pressurized oil both out of the top of an inlet through a transmission case and between the bottom of the inlet and a ported piston to which the inlet opens.

It is another object of the invention to provide such a self adjusting seal assembly that will accept a fairly wide tolerance variation and which increases in sealing effectiveness as high pressure oil is supplied.

It is yet another object of the invention to provide such a self adjusting seal assembly having inner and outer sleeves with an axial space defined between facing annular walls of the two sleeves that are also spring biased apart, and with a compression seal on the lower edge of the inner sleeve that surrounds the piston port and a lip seal on the annular wall of the inner sleeve that wipes the inside of the outer sleeve, so that the spring will create some compression of the compression seal against the piston regardless of tolerance variations, while the introduction of pressurized oil will cause greater compression of the compression seal.

DESCRIPTION OF THE PREFERRED EMBODIMENT

These and other objects and features of the invention will appear from the following written description, and from the drawings, in which.

Figure 1:
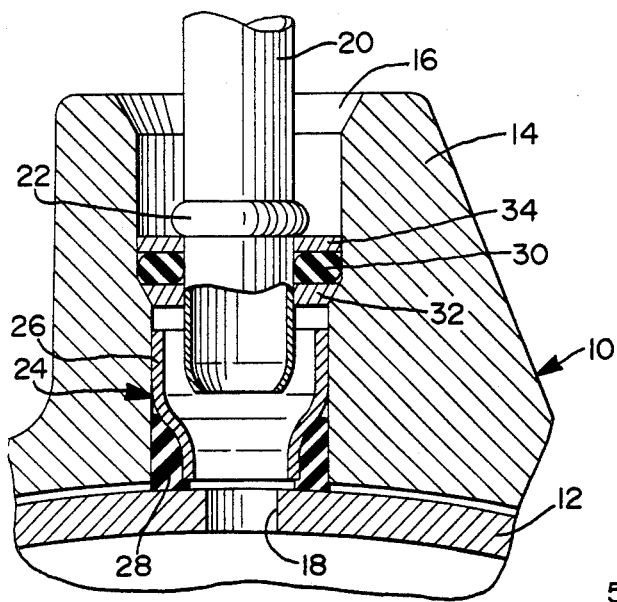
FIG. 1 is the prior art seal described above.
Figure 2:
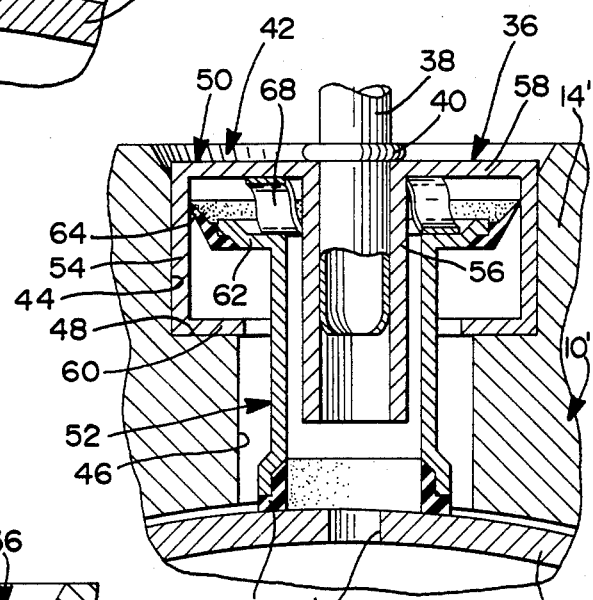
FIG. 2 is a view like FIG. 1, but showing a preferred embodiment of the self adjusting seal assembly of the invention, after seal installation, but prior to the introduction of high pressure oil.

Referring first to FIG. 2, a preferred embodiment of the self adjusting seal assembly of the invention is indicated generally at 36. Some elements of the environment, such as the transmission case 10, case boss 14, piston 12 and port 18, are essentially identical to that described above, and are given the same number with a prime. The supply pipe is virtually identical, but is somewhat longer at the end, and is therefor indicated at 38, with a stop ridge 40. The inlet through the transmission case 10, although generally a stepped cylinder as above, is different in its exact internal shape, and is indicated generally at 42. Inlet 42 has an upper cylindrical surface 44, a lower cylindrical surface 46, and an intermediate annular shelf 48. Unlike the prior art seal described above, where the various parts of the seal act independently, seal assembly 36 includes first and second cooperating stamped steel sleeves, indicated generally at 50 and 52. First sleeve 50 has a cylindrical outer wall 54 and a generally cylindrical and concentric inner wall 56, which are joined by a annular top wall 58. The inner wall 56 has an inside diameter substantially equal to the outside diameter of supply pipe 38, so as to make a tight, leak proof friction fit when pipe 38 is inserted therein, stopping when pipe ridge 40 hits top wall 58. The friction fit of pipe 38 prevents the escape of oil out the top of inlet 42. The outer wall 54 has an outside diameter substantially equal to the inside diameter of the inlet upper part 44, so as to make a tight friction fit when first sleeve 50 is installed by insertion into inlet 42. That friction is tight enough to retain first sleeve 50 in inlet 42, but need not be tight enough to be leak proof. Outer wall 54 also has an annular inturned flange 60, which is added in a last step in building seal assembly 36, as will be further described below. When first sleeve 50 is installed, flange 60 seats on shelf 48 to act as a stop member.

Still referring to FIG. 2, second sleeve 52 has a diameter such that it can be located radially between the first sleeve inner wall 56 and outer wall 54, radially spaced from both. Second sleeve 52 also has an upper annular wall 62 which extends radially past flange 60 and which is axially spaced from and confronts the first sleeve annular top wall 58. Molded to the periphery of the inner sleeve annular wall 62 is an axially upwardly and radially outwardly extending elastomer lip seal 64. The diameter of the outermost edge of lip seal 64 is sufficient to make wiping contact with the inner surface of first sleeve outer wall 54, as shown. The lower edge of second sleeve 52 has a circular elastomer compression seal 66 molded thereto. A suitable spring means, which in this case is a wave spring 68, is located between the first sleeve annular wall 58 and the second sleeve annular wall 62. In building seal assembly 36, spring 68 is dropped into place and second sleeve 52 added before flange 60 is formed on first sleeve outer wall 54. After flange 60 is formed, the interference of flange 60 and second sleeve annular upper wall 62 retains all the components together, as a unit. Therefore, seal assembly 36 may be installed in one step by installing first sleeve 50 as described above. Flange 60 will abut shelf 48 as compression seal 66 abuts piston 12' and seals around port 18'. Spring 68 will be simultaneously compressed between the two facing annular walls 58 and 62. Pipe 38 may be added before or after the installation of seal assembly 36. Whatever the stack up of manufacturing tolerances between and among the various parts may be, including the outer surface of piston 12', the shelf 48, flange 60, the annular walls 62 and 58 and the compression seal 66, the wave spring 68 will assure that there is some compression of seal 66 against the outer surface of piston 12' and around port 18' before the introduction of high pressure oil through pipe. So, seal assembly 36 is self adjusting in the sense of compensating for manufacturing tolerances.

Figure 3:
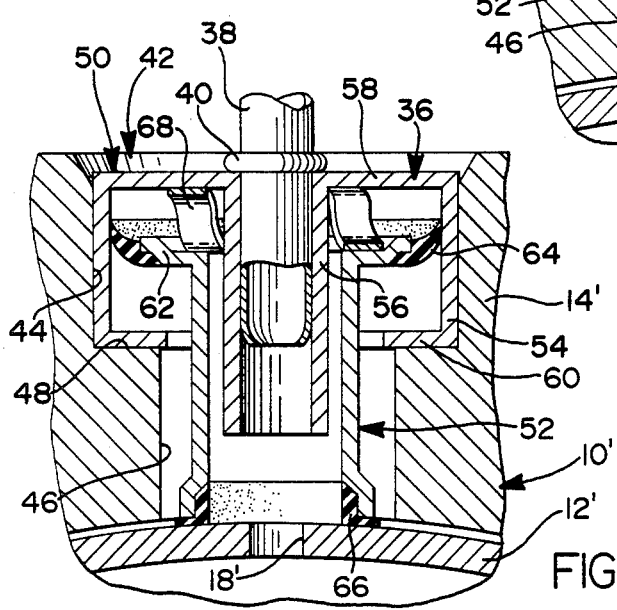
FIG. 3 is like FIG. 2, but showing the seal compression after the introduction of high pressure oil.

Next, by comparing FIG. 3 to FIG. 2, the operation of seal assembly 36 after the introduction of high pressure oil through pipe 38 may be seen. Entering oil flows between the first sleeve inner wall 56 and the second sleeve 52 into the axial space between the opposed annular walls 58 and 62. The wave spring 68 does not interfere with that flow. The oil will be blocked by the lip seal 64, so that the axial space will be pressurized, creating a downward force against annular wall 62 and compressing seal 66 more strongly against piston 12'. Therefore, seal assembly 36 is also self adjusting in the sense of automatically increasing its sealing effectiveness when needed, that is, at the introduction of high pressure oil, unlike the static seal described above. In conclusion, seal assembly 36 is an improvement over the seal described above in terms of ease of installation, tolerance compensation, and sealing effectiveness.

Variations in the preferred embodiment may be made. For example, the seal assembly would work in any inlet in any housing, like transmission case 10, that had a ported bottom wall. The inlet bottom wall need not consist of a separate structure, like the piston 12 disclosed. While, in such a structure, there would be no need to prevent the escape of oil between the piston and the bottom edges of the inlet, a compression seal like seal 66 would still be useful, in conjunction with lip seal 64, in preventing oil from reaching the interface between the inside surface of the upper part of the inlet 44 and the outside surface of the first sleeve outer wall 54. The first sleeve inner wall 56 is not absolutely necessary, as the pipe 38 could be tightly received through a simple round hole cut centrally through the annular top wall 58. The length of inner wall 56 is useful in maintaining a seal around pipe 38, however. Flange 60 is not absolutely necessary, but it is a great advantage in maintaining the two sleeves 50 and 52 together, and also cooperates with the shelf 48 to provide a convenient stop during installation. Other types of springs could be used, as long as they did not block the flow of oil. Therefore, it will be understood that the invention is not intended to be limited to just the preferred embodiment disclosed.

The embodiments of the invention in which an exclusive property or privilege is claimed are defined as follows:

1. A self adjusting seal assembly for use with a pipe that supplies a high pressure fluid through an inlet in a housing, said housing inlet including a generally cylindrical side wall, a generally planar bottom wall, and a central port through said bottom wall, said seal assembly comprising, a generally cylindrical outer sleeve having a generally annular top wall axially spaced from said inlet bottom wall and through which said pipe is centrally received, said outer sleeve also having an outer wall joined continuously to the periphery of said annular top wall and sized so that the outer surface thereof tightly fits within said inlet cylindrical wall to retain said outer sleeve in said inlet, a generally cylindrical inner sleeve located within and radially inwardly spaced from said outer sleeve and radially outwardly spaced from said pipe, said inner sleeve having a generally radially extending upper end surface axially spaced from said outer sleeve top wall and a lower edge located proximate said inlet bottom wall, a lip seal on said inner sleeve upper end surface wipingly engaged with the inside of said outer sleeve outer wall, a compression seal on said inner sleeve lower edge compressible against said inlet bottom wall in surrounding relation to said port, and, resilient means engageable between said outer sleeve top wall and said inner sleeve to bias said compression seal against said inlet bottom wall, whereby, before high pressure fluid leaves said pipe, said compression seal will be maintained compressed against said inlet bottom wall regardless of tolerance variations in the spacing between said outer sleeve top wall and said inlet bottom wall, and when high pressure fluid does leave said pipe, it will, by virtue of being blocked by said lip seal, pressurize the space between said outer sleeve top wall and said inner sleeve upper end surface and force said compression seal more strongly against said inlet bottom wall.

2. A self adjusting seal assembly for use with a pipe that supplies a high pressure fluid through an inlet in a housing, said housing inlet including a generally cylindrical side wall, a generally planar bottom wall, and a central port through said bottom wall, said seal assembly comprising, a first sleeve having a generally cylindrical outer wall and a generally cylindrical and concentric inner wall joined by an annular top wall, said inner wall being sized so as to tightly receive said pipe therein and said outer wall being sized so as to fit tightly within said inlet cylindrical wall to retain said first sleeve in said inlet, a generally cylindrical second sleeve located radially between said first sleeve inner and outer walls, said second sleeve having an upper annular wall axially spaced from said first sleeve annular top wall and a lower edge located proximate said inlet bottom wall, a lip seal on said second sleeve upper annular wall wipingly engaged with the inside of said first sleeve outer wall, a compression seal on said second sleeve lower edge compressible against said inlet bottom wall in surrounding relation to said port, and, spring means compressed between said first sleeve annular wall and said second sleeve annular wall so as to bias said compression seal against said inlet bottom wall, whereby, before high pressure fluid leaves said pipe, said compression seal will be maintained compressed against said inlet bottom wall regardless of tolerance variations in the spacing between said first sleeve annular top wall and said inlet bottom wall, nd when high pressure fluid does leave said pipe, it will flow between said first sleeve inner wall and said second sleeve to the axial space between said annular walls and, by virtue of being blocked by said lip seal, pressurize said axial space and force said compression seal more strongly against said inlet bottom wall.

* * * * *